United States Patent [19]

Shimogawara

[11] Patent Number: 4,509,872

[45] Date of Patent: Apr. 9, 1985

[54] CHARACTER SELECTING AND INKED RIBBON FEEDING MECHANISM FOR A SERIAL PRINTER

[75] Inventor: Jun Shimogawara, Tokyo, Japan

[73] Assignee: NEC Corporation, Tokyo, Japan

[21] Appl. No.: 542,970

[22] Filed: Oct. 18, 1983

[30] Foreign Application Priority Data

Oct. 18, 1982 [JP] Japan ............................ 57-182345

[51] Int. Cl.³ ........................ B41J 1/44; H02K 7/20

[52] U.S. Cl. ............................ 400/144.1; 310/112; 400/185; 400/225; 101/93.18

[58] Field of Search .................... 400/144, 144.1, 225, 400/257, 185; 310/112; 101/93.16–93.19

[56] References Cited

U.S. PATENT DOCUMENTS

| | | | |
|---|---|---|---|
| 3,163,791 | 12/1964 | Carlson | 310/112 X |
| 3,174,065 | 3/1965 | Jaun | 310/112 X |
| 3,407,680 | 10/1968 | Westmoreland | 310/112 X |
| 3,454,779 | 7/1969 | Meijer | 310/112 X |
| 3,941,229 | 3/1976 | Becchi et al. | 400/144.1 |
| 4,037,707 | 7/1977 | Ku et al. | 400/144.1 |
| 4,099,106 | 7/1978 | Nikaido | 400/257 X |
| 4,389,126 | 6/1983 | Honma et al. | 400/144.1 X |

FOREIGN PATENT DOCUMENTS

| | | | |
|---|---|---|---|
| 33226 | 8/1981 | European Pat. Off. | 400/144.1 |
| 130124 | 8/1978 | German Democratic Rep. | 400/144.1 |
| 20486 | 2/1983 | Japan | 400/144.1 |

*Primary Examiner*—Paul T. Sewell

*Attorney, Agent, or Firm*—Sughrue, Mion, Zinn, Macpeak, and Seas

[57] ABSTRACT

A serial printer of the type employing a petal like print thimble is improved by employing a first motor for character selection in a circumferential direction of the thimble, and a second motor for selection of the vertical position of the print thimble, which has plural circumferentially arrayed sets of characters spaced vertically, by shifting the shaft of the first motor along its axis. When the second motor rotates in a second direction, it serves to advance the ink ribbon of the printer.

15 Claims, 20 Drawing Figures

FIG. 10(b)
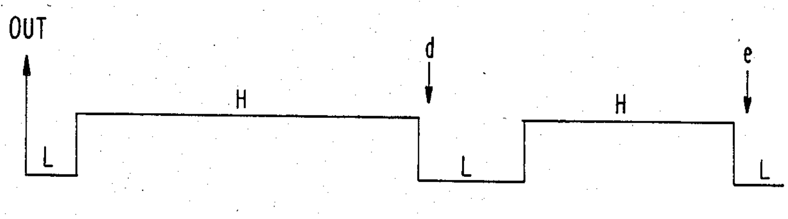
FIG. 10(a)
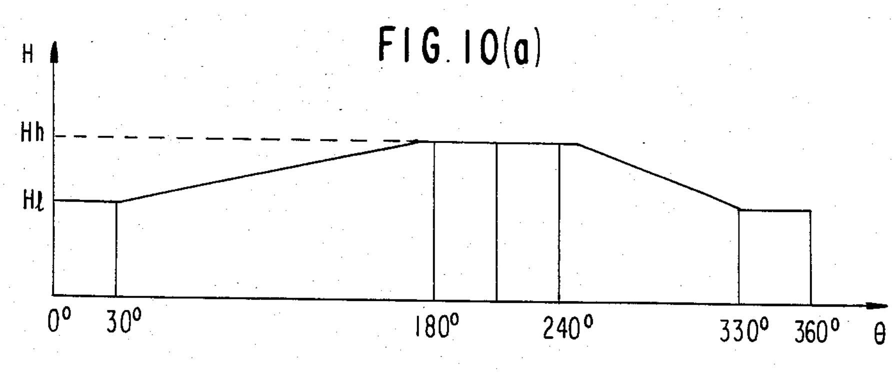
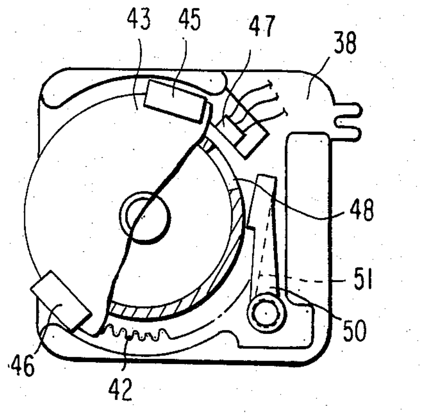
FIG. 11(a)
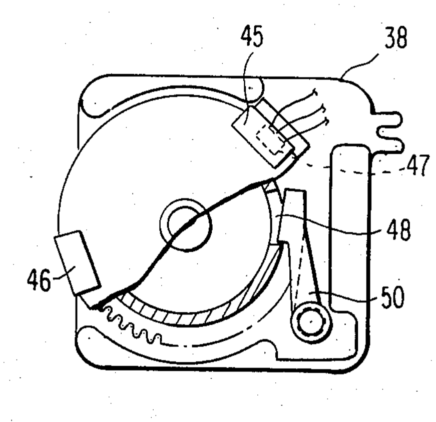
FIG. 11(b)

CHARACTER SELECTING AND INKED RIBBON FEEDING MECHANISM FOR A SERIAL PRINTER

BACKGROUND OF THE INVENTION

The present invention relates to a serial printer having a petal-type print thimble, and more particularly to an improved carrier unit in a serial printer which selects and prints one of the characters arranged on one of the upper and lower positions on the peripheral surface of a print thimble.

A conventional carrier unit for a serial printer of this type is equipped with a petal-type print thimble which has a plurality of characters on the surface thereof, as disclosed in U.S. patent application Ser. No. 477,833. In order to select one of these characters, the print thimble is rotated in a horizontal direction and is also shifted in a vertical direction. The petal-type print thimble is secured to an upper portion of the axle of a first stepping motor and is rotated with the axle in the horizontal direction. The rotary axle of the first stepping motor can also be shifted in the vertical direction. An eccentric cam engages a lower portion of the rotary axle of the first stepping motor. In order to rotate the eccentric cam, a second stepping motor is provided underneath the first stepping motor. The rotary axle of the second stepping motor is disposed perpendicularly to that of the first stepping motor.

Namely, a first stepping motor for rotating the petal-type print thimble in the horizontal direction, and a second stepping motor for shifting the print thimble in the vertical direction are respectively required in order to select characters. Further, the carrier unit requires still another motor for driving the inked ribbon disposed between the print thimble and the printing paper.

In the conventional carrier unit for the serial printer, as mentioned above, separate drive motors are required to perform respective operations with the result that the manufacturing cost of the printer increases.

SUMMARY OF THE INVENTION

Therefore, an object of the present invention is to provide a carrier unit for a serial printer, which employs a reduced number of drive motors and which can be manufactured at a reduced cost.

Another object of the present invention is to provide a novel shift mechanism for a petal-type print thimble.

According to the present invention, there is obtained a carrier unit for a serial printer, which can shift the print thimble and can also advance the inked ribbon using only one drive motor.

BRIEF DESCRIPTION OF THE DRAWINGS

The above-mentioned and other objects, features and advantages of the present invention will be better understood from the following detailed description of a preferred embodiment of the present invention taken in conjunction with the accompanying drawings, wherein:

FIGS. 10(*a*) and 10(*b*) are graphs illustrating the relation between the rotational angle of the plane cam and the cam surface shown in FIG. 9(*a*), and the output of the Hall IC shown in FIG. 9(*b*);

FIGS. 11(*a*) and 11(*b*) illustrate a cam cover used in the carrier unit shown in FIG. 8, i.e., a party exploded plan view taken along the line XI—XI of FIG. 8;

DESCRIPTION OF THE PREFERRED EMBODIMENTS

Figure 1:
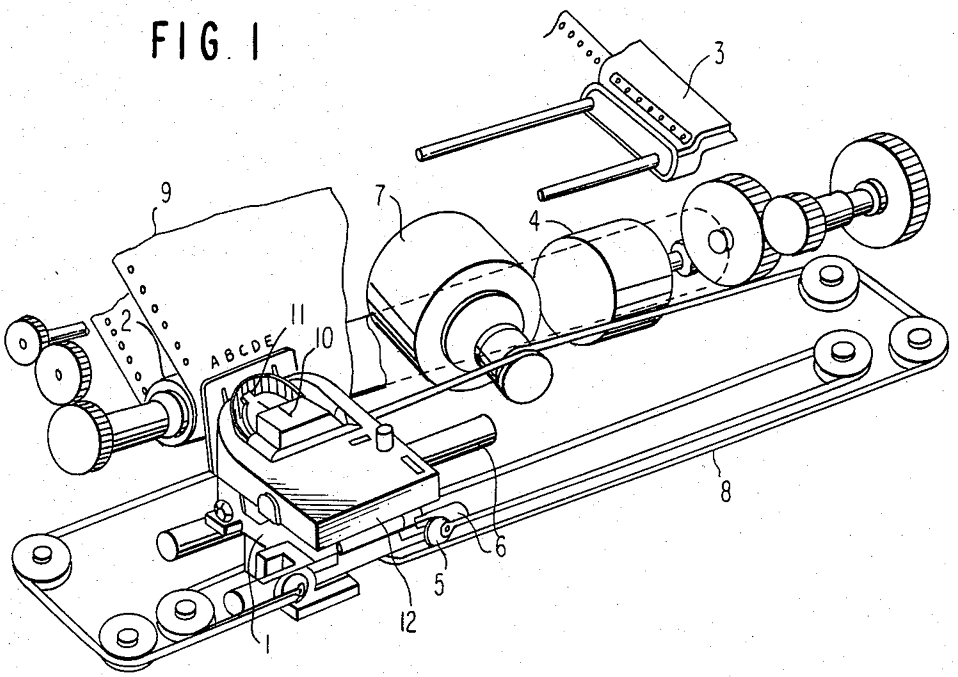
FIG. 1 is a prespective view illustrating major portions of a serial printer according to an embodiment of the present invention.

Referring to FIG. 1, a carrier unit 1 is opposed to a platen 2. The platen 2 and a tractor unit 3 are actuated by a pulse motor 4 for feeding the paper 9 wound around the platen 2. The carrier unit 1 engages two guide shafts 6 via a plurality of guide bearings 5. The shafts 6 are fastened to a frame of the printer which is not shown. The carrier unit 1 is transported in parallel with the platen 2 by a spacing motor 7 via a spacing wire 8.

The carrier unit 1 mounts a print hammer mechanism 10, a petal-type print thimble 11, an inked ribbon cassette 12, and motors for driving the same. The print hammer mechanism 10 prints a character which is selected among those arrayed on the print thimble 11 onto the paper 9 via an inked ribbon. The carrier unit 1 is intermittently moved by the spacing motor 7 in the direction of the printing line after the printing of each character. When printing is completed for one line, the paper 9 is advanced by one line by the pulse motor 4. The carrier is then moved again in the lateral direction to print characters onto the paper 9.

Figure 2:
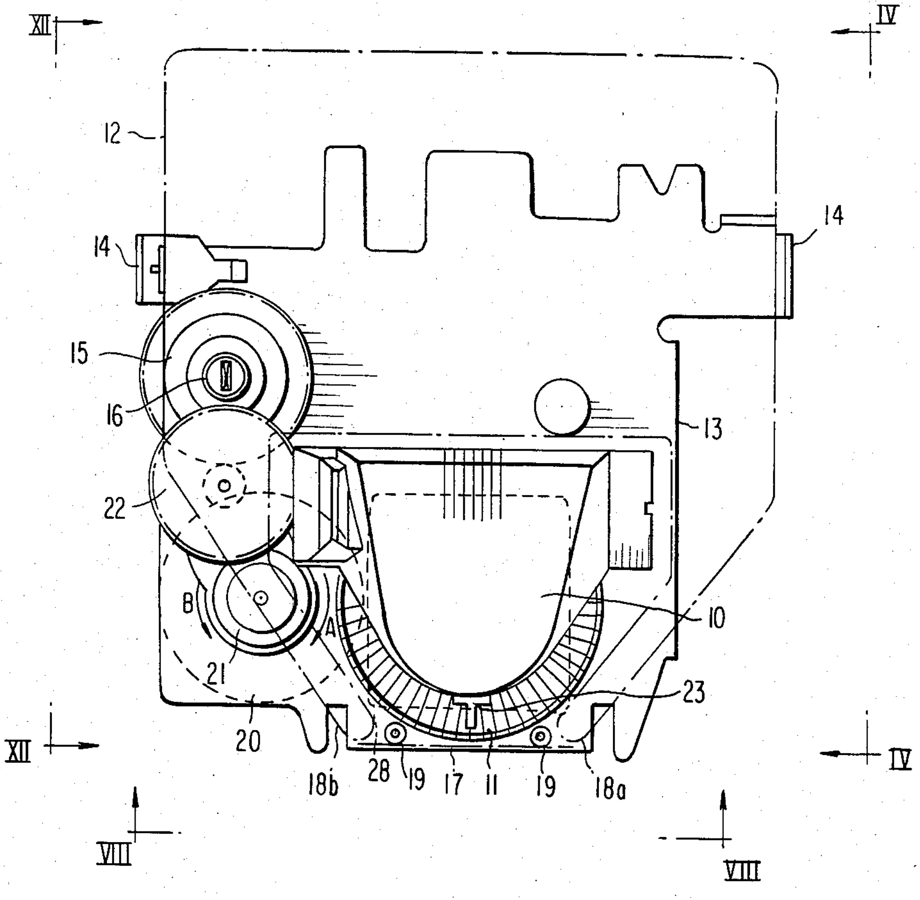
FIG. 2 is a plan view of a carrier unit used in the preferred embodiment shown in FIG. 1.

Referring to FIG. 2, the ribbon cassette 12 is supported by the arms 14 of a carrier base 13 and by a stopper which is not shown. A shaft 16 of a ribbon feed piece 15 engages a feed roller of the ribbon cassette 12. The ribbon 17 runs out of the cassette 12 through an arm 18*a*, runs on the outer side of two ribbon guides 19, and returns to another arm 18*b*. Namely, the ribbon 17 runs between the print thimble 11 and the platen 2.

A stepping motor 20 is provided beneath the carrier base 13 to drive the ribbon 17. A motor gear 21 of the motor 20 is located on the carrier base 13 to rotate a ribbon feed unit 15 via an idle gear 22.

When the hammer mechanism 10 is driven, a print hammer 23 protrudes toward the platen 2, and then, a character formed on a finger of the print thimble 11 and opposed to the print hammer 23 is made to hit the platen 2.

Figure 3:
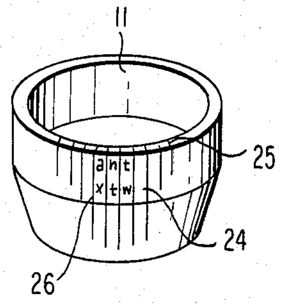
FIG. 3 is a perspective view of a petal-type print thimble used in the preferred embodiment shown in FIG. 1.

The petal-type print thimble 11 is shaped like a cup and includes a plurality of resilient fingers 24 as shown in FIG. 3. Characters 25 and 26 are arrayed on the upper and lower positions of fingers 24. The upper and lower characters are arrayed on spaced circumferential lines of the print thimble 11.

Figure 4:
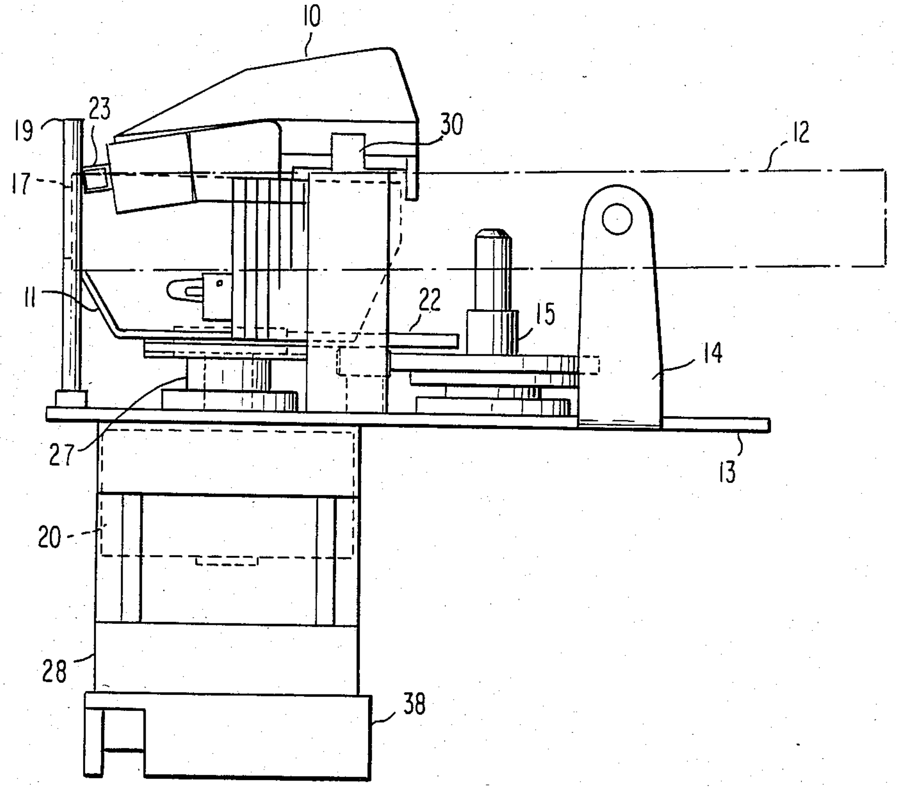
FIG. 4 is a side view of the carrier unit taken along the line IV—IV of FIG. 2.

Referring to FIG. 4, the print thimble 11 is supported on the carrier base 13 by a print mounting unit 27 which is secured to the shaft 29 of a stepping motor 28. A hammer support 30 stands on the carrier base 13 to support the print hammer mechanism 10 such that the print hammer 23 is positioned at the rear side of the print thimble 11.

Figure 5:
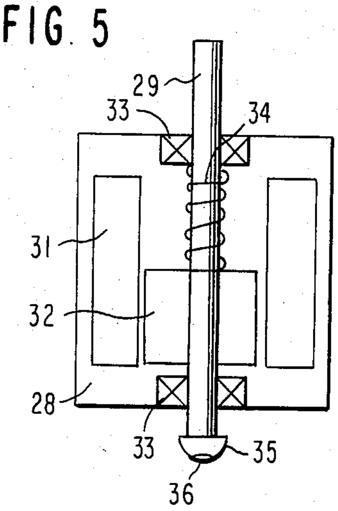
FIG. 5 is a sectional view of a stepping motor used in the carrier unit shown in FIG. 2.

Referring to FIG. 5, in the interior of the stepping motor 28, the stator 31 is longer in the axial direction than the rotor 32 fastened to the rotary shaft 29. Bearings 33 support the shaft 29 such that the shaft 29 can be rotated in the running direction of the motor 28 and can also be shifted in the vertical direction. A spring 34 urges the shaft 29 downwardly. The shaft 29 has a cam follower 35 at its lower portion. A spherical bearing 36 is further provided in an end position of the cam follower 35. Additionally, the stator 31 is longer than the moving range of the rotor 32 in the axial direction.

Figure 6:
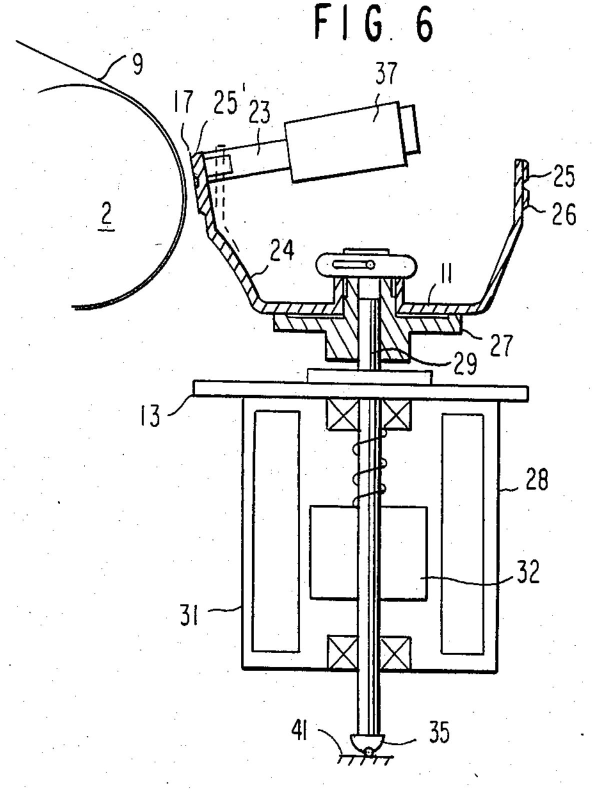
FIGS. 6 and 7 are side views illustrating the shifting operation of the stepping motor and the print thimble used in the carrier unit shown in FIG. 2.
Figure 7:
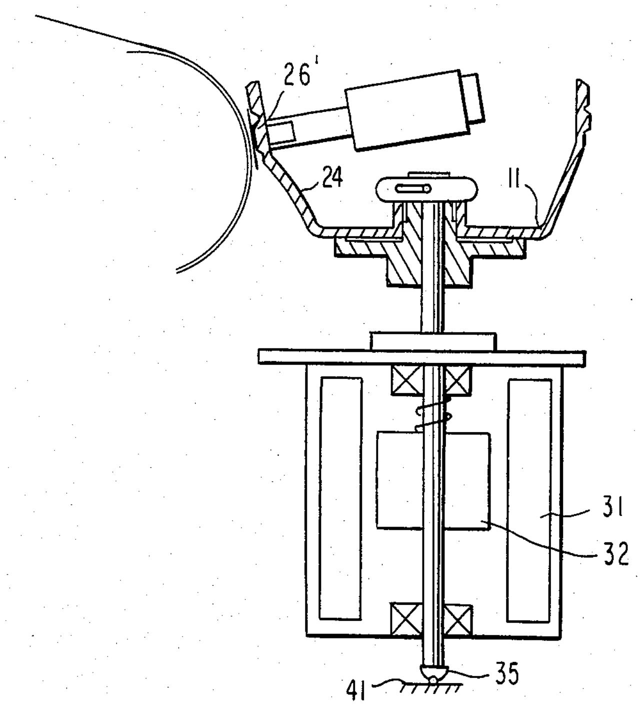

When the characters 25 at the upper position of the print thimble 11 are to be printed, the shaft 29 and the print thimble 11 are located at lower positions as shown in FIG. 6. A character 25' is selected out of a plurality of upper positioned characters 25 by the rotation of motor 28, and is disposed between the print hammer 23 and the platen 2. As a hammer drive unit 37 of the print hammer mechanism 10 is excited, the hammer 23 protrudes toward the platen 2, hits the finger 24, and presses the character 25' onto the platen 2. Since the ribbon 17 and paper 9 are interposed between the character 25' and the platen 2, the ink of the ribbon 17 is transferred onto the paper 9. When the characters 26 at the lower position of the print thimble 11 are to be printed, the shaft 29 and the print thimble 11 are pushed upwardly as shown in FIG. 7. Therefore, a character 26' selected from the lower positioned characters 26 is disposed between the hammer 23 and the platen 2. Then, in the same manner described above, the character 26' is printed onto the paper 9 by the motion of hammer 23. That is the up and down shifting of the shaft 29 operates to select the upper or lower positioned characters 25 or 26 of the print thimble 11.

Figure 8:
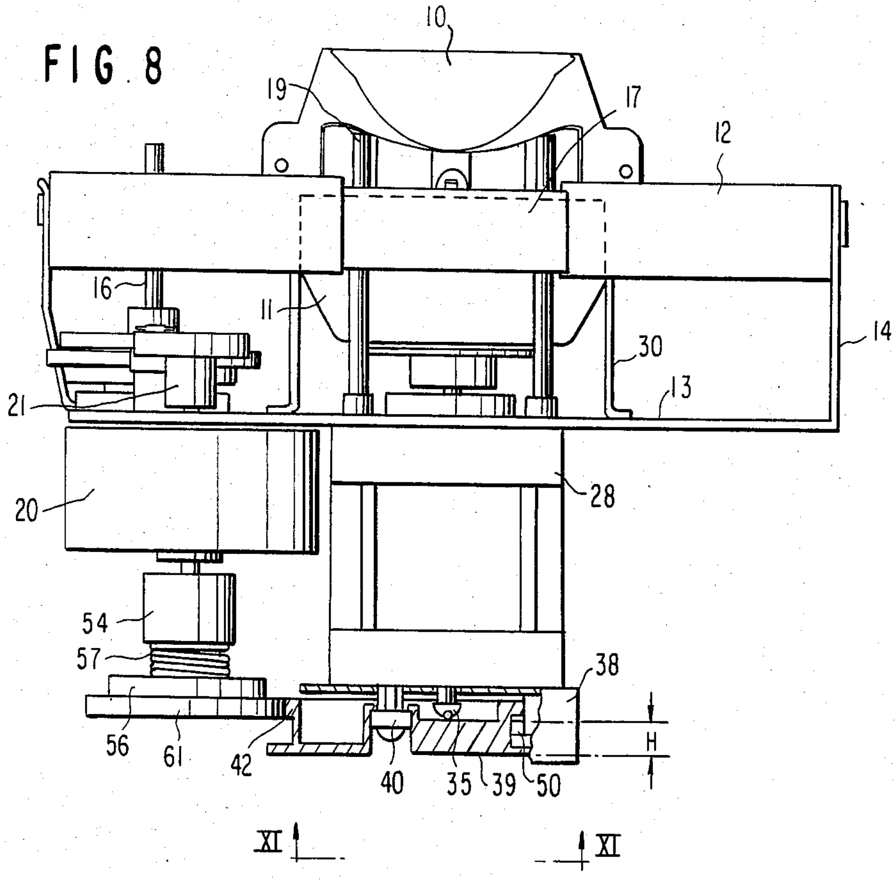
FIG. 8 is a side view of the carrier unit taken along the line VIII—VIII of FIG. 2.
Figure 9A:
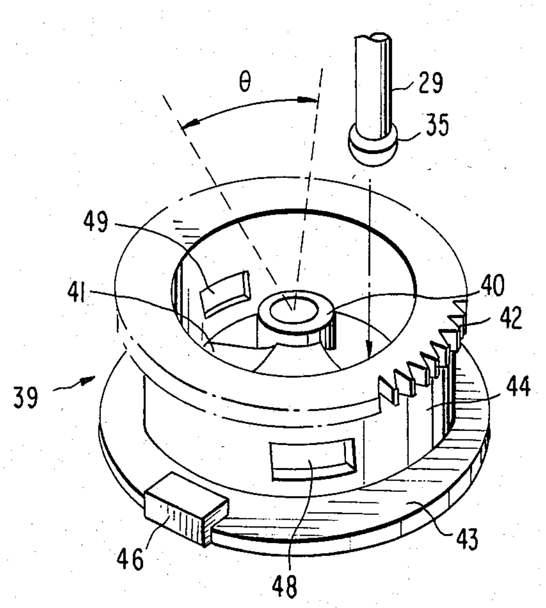
FIGS. 9(*a*) and 9(*b*) are perspective and sectional views of a plane cam used in the carrier unit shown in FIG. 8.
Figure 9B:
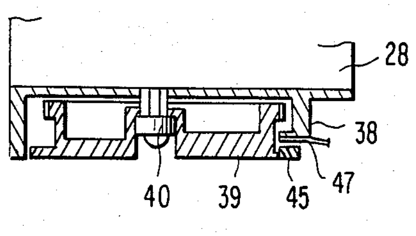

A mechanism for performing the shifting operation will now be described. As shown in FIGS. 8 and 9(*a*), the rotary motor 28 has a cam cover 38 attached to the lower portion thereof. A plane cam 39 is attached via a bearing 40 to the cam cover 38. The cam follower 35 of the shaft 29 of the motor 28 engages a cam surface 41 formed on the upper surface of plane cam 39.

The cam curve of cam surface 41 is shown in FIG. 10(*a*), where $\theta$ represents the rotational angle of the cam 39, and H represents the height of cam surface 41 with which the cam follower 35 is engaged. That is, when the rotational angle $\theta$ is from 0° to 30°, and from 330° to 360°, the height H becomes minimum a $H_l$, i.e., the cam surface 41 is flat in these sections. The height H gradually increases over the rotational angle $\theta$ of from 30° to 180°, and reaches a maximum $H_h$ over the section from 180° to 240°. The cam surface 41 is also flat over this section. The height H gradually decreases over the rotational angle from 240° to 330°, and becomes the minimum $H_l$.

Namely, when the cam follower 35 engages the cam sections from $\theta=0°$ to 30° and $\theta=330°$ to 360° on the cam surface 41, the shaft 29 and the print thimble 11 are located at their lower positions (FIG. 6). When the cam follower 35 engages with the section from $\theta=180°$ to 240° on the cam surface 41, the shaft 29 and the print thimble 11 are located at their upper positions (FIG. 7).

Referring to FIGS. 9(*a*), 9(*b*) and 11, the plane cam 39 has a gear 42 at an upper circumferential position, a circular plate 43 at a lower portion, and an intermediate portion 44 whose diameter is smaller than the circular plate 43. Magnets 45 and 46 are provided at predetermined positions on the circular plate 43. A Hall IC 47 is provided on the cam cover 38 at a portion opposed to the circular plate 43. The Hall IC 47 detects the magnets 45 and 46 when the plane cam 39 rotates in the cam cover 38 in order to detect the rotational angle of the plane cam 39. Namely, as shown in FIG. 10(*b*), the Hall IC 47 produces outputs of the L (low) level over the rotational angles $\theta$ of the cam from 0° to 30°, 180° to 240°, and 330° to 360°, and produces outputs of the H (high) level at other angles. That is, magnets 45, 46 on the circular plate 43 are so disposed as to be opposed to the Hall IC 47 when the cam follower 35 is located on the flat portions of the cam surface 41.

Referring again to FIGS. 9(*a*) and 11, openings 48 and 49 are formed at predetermined positions in the intermediate portion 44 of plane cam 39. A detent 50 is rotatably provided on the cam cover 38 such that it is opposed to the intermediate portion 44 of cam cover 38, and is urged by a torsion spring 51 in the counterclockwise direction in FIGS. 11(*a*) and 11(*b*). Therefore, the plane cam 39 is allowed to freely rotate in the clockwise direction but is prevented from rotating in the counterclockwise direction since the detent 50 will engage the opening 48 or 49 (FIG. 11(*b*)). The stop positions are indicated by d and e in FIG. 10(*b*). That is, the rotation of the cam 39 is stopped immediately after the output of the Hall IC 47 has changed to the L (low) level. In other words, at the stop positions, the cam follower 35 is located on the flat portions of the cam surface 41.

Figure 12:
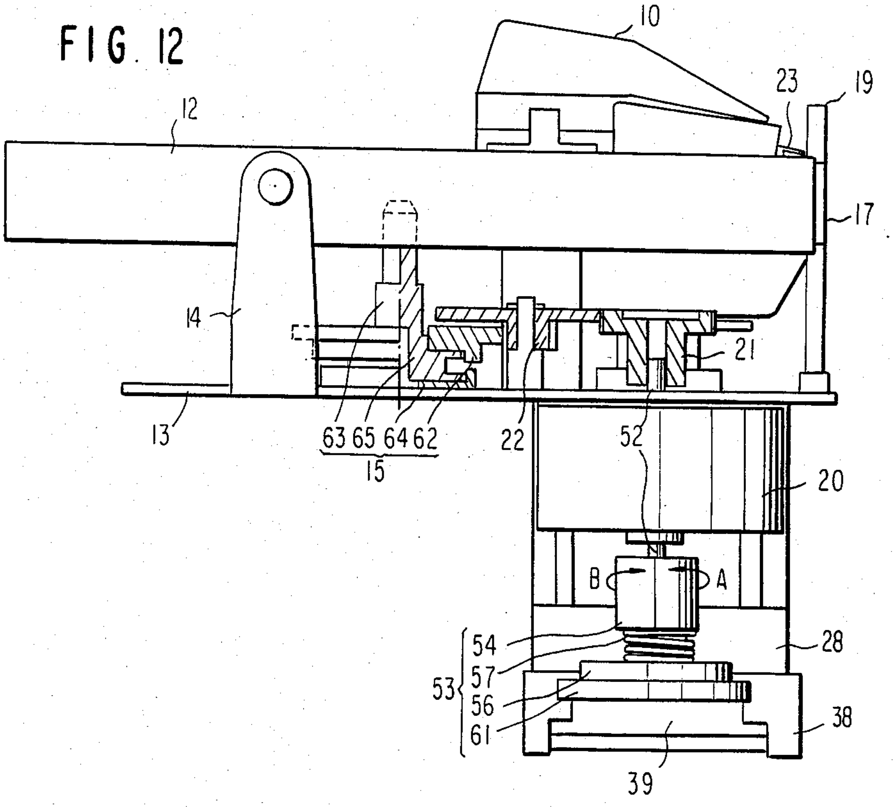
FIG. 12 is a side view of the carrier unit taken along the line XII—XII of FIG. 2.
Figure 13:
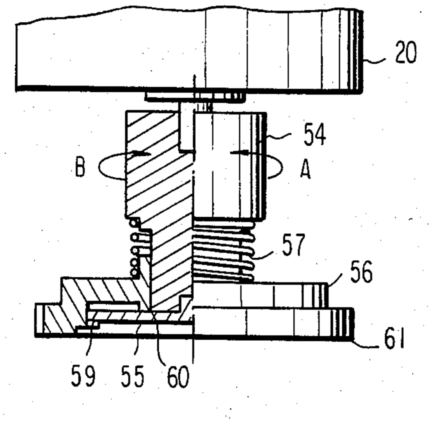
FIGS. 13(*a*) and 13(*b*) are sectional and exploded perspective views of a vertical clutch unit used in the carrier unit shown in FIG. 12.
Figure 13:
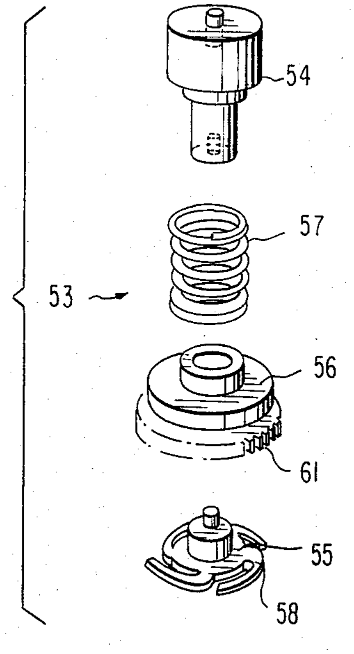
Figure 14A:
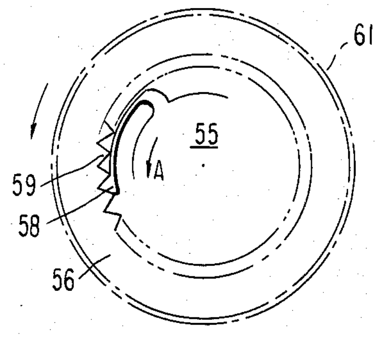
FIGS. 14(*a*) and (*b*) illustrate the motion of the vertical clutch unit shown in FIGS. 13(*a*) and 13(*b*)
Figure 14B:
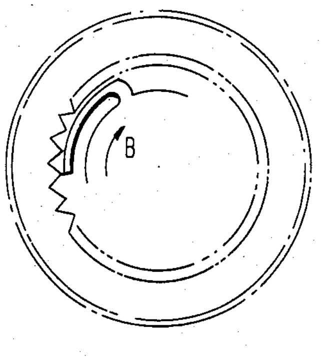

The motor shifting and inked ribbon feeding mechanism of the stepping motor 20 will now be described. Referring to FIGS. 12, 13(*a*), 13(*b*), 14(*a*) and 14(*b*) the stepping motor 20 is secured to the carrier base 13, and has a shaft 52 which protrudes in directions therefrom. A clutch shaft 54 of a vertical clutch unit 53 is tightly fitted to a lower portion of the shaft 52. The vertical clutch unit 53 consists of a clutch shaft 54, a clutch plate 55, a clutch cover 56, and a spring 57. The clutch shaft 54 and clutch plate 55 adhere together, and the spring 57 urges the clutch cover 56 to the clutch plate 55. The clutch plate 55 has arm members 58, and a ratchet 59 is formed in the inner surface of the clutch cover 56.

As the clutch shaft 54 rotates in the direction of arrow A, the arm members 58 engage the ratchet 59, whereby the clutch cover 56 rotates together with the clutch shaft 54 (FIG. 13(*a*)). When the clutch shaft 54 rotates in the reverse direction (arrow B), the arm members 58 deflect toward the central direction, and torque is not transmitted to the clutch cover 56 by the arm members 58. However, since the friction portion 60 of the clutch cover 56 is pressed onto the clutch plate 55 by the spring 57, the torque is slightly transmitted to the clutch cover 56. A gear 61 is formed along the circumference of the lower portion of the clutch cover 56 and engages the gear 42 formed along the circumference of the plane cam 39 to drive the same (See FIG. 8).

When the step motor 20 rotates in the direction A, the clutch cover 56 engages the clutch plate 55, and makes the plane cam 39 rotate in the clockwise direction in FIG. 11(*a*). After the output of Hall IC 47 has assumed the L level, the step motor 20 further rotates by one step in the same direction, and then stops. Thus, the plane cam 39 is also stopped with the cam follower 35 being located on a flat portion of the cam surface 41. The detent 50 engages either the opening 48 or 49 of plane cam 39. Therefore, the plane cam 39 remains stopped even if the stepping motor 20 thereafter rotates in the reverse direction (arrow B). Here, the reason for making the stepping motor 20 further rotate by one step after the output of Hall IC 47 has taken the L level is that the position at which the output of Hall IC 47 becomes low slightly deviates from the position at which the detent 50 engages the opening 48 or 49. Therefore, whenever the detent 50 engages the opening 48 or 49, the cam follower 35 of the shaft 29 is reliably positioned on the flat portion of the cam surface 41. Further, because of the considerably fast rotation of the stepping motor 20, the plane cam 39 tends to keep running due to its rotational moment even after the stepping motor 20 has stopped. However, the rotational moment is absorbed by the torque of the vertical clutch unit 53 in a reverse rotating direction B, which is determined by the strength of the spring 57.

When the printer is initially actuated, it is necessary to determine the engagement position of the cam follower 35 with respect to the cam surface 41 of plane cam 39. Accordingly, first, the plane cam 39 is rotated in the direction A by the stepping motor 20 until the output of Hall IC 47 assumes the L level. Next, the plane cam 30 is further rotated in the same direction until the output of the Hall IC 47 becomes L again, while counting the number of steps of the stepping motor 20. Since the magnets 45 and 46 are mounted at asymmetrical positions, as shown in FIG. 11(*b*), it is possible to determine which flat portion of the cam surface 41 is engaged by the cam follower 35 depending upon the number of steps counted. Namely, when the number of steps counted is relatively large, the cam follower 35 engages the flat portion from $\theta=180°$ to 240° of the cam surface 41. In effect, the shaft 29 of motor 28 is located at its upper position. When the number of counted is relatively small, the cam follower 35 engages the flat portion from $\theta=0°$ to 30° or $\theta=330°$ to 360° of the cam surface 41, and the shaft 29 is located at its lower position. The number of steps of the stepping motor 20 can be counted by conventional means, the description of which is omitted here.

The ribbon feed mechanism will be described below. A ribbon feed motor gear 21 is tightly fitted to the shaft 52 which protrudes upwardly from the stepping motor 20 as shown in FIG. 12. An idle gear 22 transmits the torque of the motor 20 to a ribbon feed unit 15 which consists of a ribbon feed gear 62, a ribbon feed piece 63, and a ribbon feed detent 64. The ribbon feed detent 64 is secured to the carrier base 13, and the other members are rotatably supported. The ribbon feed piece 63 further has a shaft 16 which engages the feed roller of inked ribbon cassette 12, and a clutch portion 65 which engages the detent 64.

Figure 15:
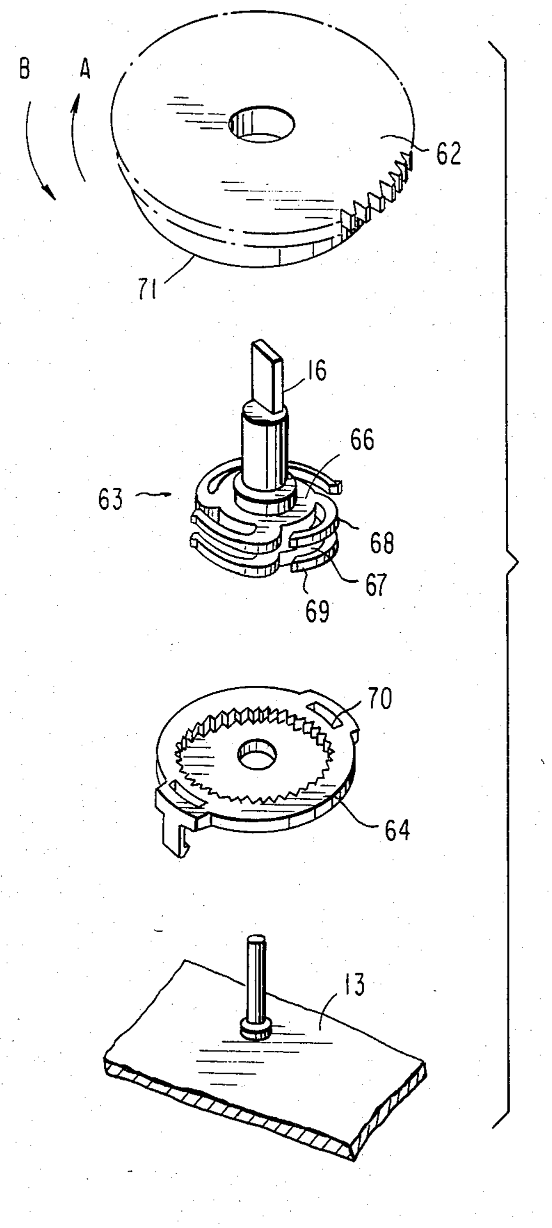
FIG. 15 is an exploded perspective view of a ribbon feed device of a ribbon feed mechanism used in the carrier unit shown in FIG. 12.

Referring to FIG. 15, the clutch portion 65 has two clutch plates 66 and 67 each having four arm members 68 and 69. Ratchets 70 and 71 are respectively formed in the inner surfaces of detent 64 and feed gear 62, which are opposed to the clutch plates 66 and 67. The clutch portion 65 is inserted in the detent 64, and the feed gear 62 is mounted on the clutch portion 65. Under this condition, the clutch plate 66 engages the inner ratchet 71 of the feed gear 62, and the clutch plate 67 engages the inner ratchet 70 of the detent 64. The clutch plates 66 and 67 respectively engage the feed gear 62 and the detent 64 only when they rotate in one direction, like the relation between the clutch plate 55 and the clutch cover 56. Accordingly, when the stepping motor 20 rotates in the direction A (i.e., in the direction in which the motor 28 will be shifted) and makes the feed gear 62 rotate in the same direction, the feed gear 62 does not engage the clutch plate 66, while the clutch plate 67 engages the detent 64. Therefore, the ribbon feed gear 62 rotates with no load, and the shaft 16 does not rotate. When the step motor 20 rotates in direction B (i.e., in the direction which does not cause the shifting operation) and makes the feed gear 62 rotate in the same direction, the feed gear 62 engages the clutch plate 66, while the clutch plate 67 does not engage the detent 64. Therefore, the shaft 16 rotates in direction B to feed the inked ribbon.

The step motor 20 advances in direction B by a predetermined angle each time before printing is effected by driving the hammer 10. Accordingly, the inked ribbon is advanced by a predetermined amount before each printing operation.

The operation of the thus constructed printer will be described below.

Prior to effecting the printing operation, the positions of the shaft 29 of the motor 28 and the print thimble are detected in the manner described above. It is now assumed that the shaft 29 of motor 28 is located at the lower position as shown in FIG. 6 (i.e., the detent 50 engages the opening 49). When it is desired to print an upper positioned character 25' of the print thimble 11, the character 25' is selected from the character group 25 by turning the motor 28 and is located between the hammer 23 and the platen 2 after that the inked ribbon 17 is fed by turning the motor 20 in the B direction. Then, the character 25' is printed on the paper 9 by the operation of hammer 23. The carrier 1 is laterally transported after the printing of each character. When it is desired to print a lower positioned character 26' of the print thimble 11, the step motor 20 rotates in the direction A until the detent 50 engages the opening 48. Under this condition, the shaft 29 of motor 28 is upwardly pushed (FIG. 7). Then, the motor 20 rotates in the direction B, and the inked ribbon is fed by a predetermined amount. Next, the motor 28 rotates such that the character 26' is selected from the character group 26 and is positioned between the hammer 23 and the platen 2. Finally, the character 26' is printed onto the paper 9 by the operation of hammer 23.

According to the present invention, as described above, the print thimble 11 is shifted up and down by the motor 20 which feeds the inked ribbon 17, and no particular (additional) drive means is required to shift the print thimble 11. Consequently, the printer can be manufactured at a reduced cost.

What is claimed is:

1. A serial printer, comprising:

a print thimble having a set of elastic fingers disposed in the form of a petal, and a plurality of characters arrayed along plural circumferences of the set of said elastic fingers, said circumferences having different heights in the vertical direction;

a first rotary motor having a shaft for rotating said print thimble, said shaft being allowed to move in its axial direction;

a plane cam engaging said shaft of said first motor, said cam enabling said shaft to shift in its axial direction in response to cam rotation;

a second rotary motor for feeding an inked ribbon, said inked ribbon being disposed near said circumferences of said print thimble; and gear means coupled with the shaft of said second motor and said plane cam;

wherein the characters arrayed along a given circumference of said print thimble are selected by the rotation of said first motor, and wherein one of said plural circumferences arrayed along the vertical direction of said print thimble is selected by the rotation of said second motor.

2. The serial printer as claimed in claim 1, wherein said first motor has a rotor fixed to said shaft, and a stator disposed around said rotor, said stator being longer than said rotor in an axial direction thereof.

3. The serial printer as claimed in claim 2, wherein said stator is longer than the range of movement of rotor in the axial direction.

4. The serial printer as claimed in claim 1, wherein said shaft of said first motor has a cam follower having a inlaid spherical bearing at the end of said shaft which engages said plane cam.

5. The serial printer as claimed in claim 1, wherein said plane cam has a cam surface, said cam surface including two flat portions having different heights.

6. The serial printer as claimed in claim 5, wherein said two flat portions are asymmetrically formed on said cam surface.

7. The serial printer as claimed in claim 1, further comprising means for detecting the rotational position of said plane cam.

8. The serial printer as claimed in claim 7, wherein said means for detecting said rotational position comprises two magnets provided at asymmetrical positions relative to a diametrical line of said plane cam.

9. The serial printer as claimed in claim 1, wherein said plane cam has means for restricting its rotation in one direction.

10. The serial printer as claimed in claim 1, wherein said second motor feeds said inked ribbon in only one direction via a clutch mechanism.

11. The serial printer as claimed in claim 1, further comprising a clutch mechanism provided between the shaft of said second motor and said gear means, said gear means permitting said plane cam to rotate in only one direction.

12. The serial printer as claimed in claim 1, wherein said second motor turns in one direction to rotate said plane cam and to enable said shaft of said first motor to shift in its axial direction, and turns in the other direction to feed said inked ribbon.

13. A motor shifting mechanism, comprising:

a first motor having a rotary shaft movable in its axial direction;

a plane cam engaging said rotary shaft for shifting said rotary shaft in its axial direction;

means for detecting the rotational angle of said plane cam in order to detect the location at which said rotary shaft engages said plane cam;

a second motor disposed substantially in parallel with said first motor and having a rotational load on a shaft thereof; and a gear member fitted to said shaft of said second motor such that said gear member engages said plane cam via a clutch mechanism;

said second motor turning in one direction to move said rotary shaft of said first motor in its axial direction, and turning in the other direction to drive said rotational load of said second motor.

14. A serial printer, comprising:

a print thimble having a set of elastic fingers disposed in the form of a petal, and a plurality of characters arrayed along plural circumferences of the set of said elastic fingers, said circumferences having different heights in the vertical direction;

a first motor having shaft for rotating said print thimble;

shift means for shifting said print thimble in the vertical direction;

a plane cam engaging said shift means, said plane cam enabling said print thimble to shift in the vertical direction by its rotation;

a second motor for feeding an inked ribbon, said inked ribbon being disposed near said print thimble; and a gear member fitted to a shaft of said second motor such that said gear member engages said plane cam;

a plurality of characters arrayed along the same circumference of said print thimble being selected by the rotation of said first motor, and one of said plural circumferences arrayed along the vertical direction of said print thimble being selected by the rotation of siad second motor.

15. A serial printer, comprising:

a print thimble having a set of elastic fingers, and a plurality of characters arrayed along plural circumferences of the set of said elastic fingers, said circumferences having different heights in the vertical direction;

a first motor having a shaft for rotating said print thimble, said shaft being allowed to move vertically;

a second motor for feeding an inked ribbon when rotating in one direction, said inked ribbon being disposed near said circumferences of said print thimble; and means for transforming the rotation of said second motor in the other direction into the vertical movement of said shaft of said first motor;

a plurality of characters arrayed along a given circumference of said print thimble being selected by the rotation of said first motor, and one of said plural circumferences arrayed along the vertical direction of said print thimble being selected by the rotation of said second motor in said other direction.

* * * * *

UNITED STATES PATENT AND TRADEMARK OFFICE

CERTIFICATE OF CORRECTION

PATENT NO. : 4,509,872

DATED : April 9, 1985

INVENTOR(S) : Jun Shimogawara

It is certified that error appears in the above-identified patent and that said Letters Patent is hereby corrected as shown below:

Column 1, line 11, "on" should be --of--.

Column 2, line 24, delete the "." and insert --;--;

line 25, insert "14" before --(b)--.

Column 3, line 48, insert a --,-- after "is".

Column 4, line 4, "on" should be --of--;

line 66, delete "the" (first occurrence).

Column 5, line 9, delete "being";

line 48, insert --steps-- after "of".

Column 6, line 26, "each time before" should be --before each time--.

Column 8, line 22, insert --a-- after "having";

line 39, "siad" should be --said--.

Signed and Sealed this

*Seventeenth* Day of *September 1985*

[SEAL]

*Attest:*

DONALD J. QUIGG

*Attesting Officer*

*Commissioner of Patents and Trademarks—Designate*